US007833640B2

(12) United States Patent
Marinero et al.

(10) Patent No.: US 7,833,640 B2
(45) Date of Patent: Nov. 16, 2010

(54) INTERMEDIATE TRI-LAYER STRUCTURE FOR PERPENDICULAR RECORDING MEDIA

(75) Inventors: Ernesto E. Marinero, Saratoga, CA (US); Natacha Frederique Supper, Campbell, CA (US); Brian R. York, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1057 days.

(21) Appl. No.: 11/208,207

(22) Filed: Aug. 19, 2005

(65) Prior Publication Data

US 2007/0042226 A1  Feb. 22, 2007

(51) Int. Cl.
G11B 5/667  (2006.01)
(52) U.S. Cl. .................................. 428/831.2; 428/829
(58) Field of Classification Search ............. None
See application file for complete search history.

(56) References Cited

U.S. PATENT DOCUMENTS

| 6,660,357 B1* | 12/2003 | Litvinov et al. ............ 428/827 |
| 6,670,056 B2 | 12/2003 | Hikosaka et al. |
| 6,699,600 B2 | 3/2004 | Shimizu et al. |
| 6,858,320 B2 | 2/2005 | Takenoiri et al. |
| 6,884,519 B2* | 4/2005 | Shimizu et al. ............. 428/831 |
| 2002/0058160 A1 | 5/2002 | Oikawa et al. |
| 2003/0203189 A1 | 10/2003 | Futamoto et al. |
| 2004/0000374 A1 | 1/2004 | Watanabe et al. |
| 2004/0001975 A1 | 1/2004 | Hikosaka et al. |
| 2004/0072031 A1 | 4/2004 | Oh et al. |
| 2004/0247945 A1 | 12/2004 | Chen et al. |
| 2005/0019608 A1* | 1/2005 | Kim et al. ............ 428/694 BS |
| 2006/0147760 A1* | 7/2006 | Uwazumi et al. ......... 428/831.2 |
| 2006/0275629 A1* | 12/2006 | Ikeda et al. .............. 428/831.2 |
| 2007/0072012 A1* | 3/2007 | Nakamura et al. ....... 428/831.2 |
| 2007/0082231 A1* | 4/2007 | Nakamura et al. ....... 428/832.1 |
| 2007/0292721 A1* | 12/2007 | Berger et al. ............. 428/828.1 |

FOREIGN PATENT DOCUMENTS

| JP | 2003123239 | 4/2003 |
| JP | 2003317221 | 11/2003 |
| JP | 2004014014 | 1/2004 |
| JP | 2004022082 | 1/2004 |
| JP | 2004220737 | 8/2004 |

OTHER PUBLICATIONS

English language translation of JP 10-228620-A (PTO 04-2291).*
Matsnunuma et al., "Very High Density and Low Cost Perpendicular Magnetic Recording Media Including New Layer Strucure 'U-Mag'", IEEE Trans on Magnetics, vol. 41, No. 2, Feb. 2005, p. 572-576.

* cited by examiner

*Primary Examiner*—Kevin M Bernatz
(74) *Attorney, Agent, or Firm*—Lorimer Labs; D'Arcy H. Lorimer

(57) ABSTRACT

An improved structure for the construction of perpendicular recording media is disclosed. The structure includes a tri-layer IML resident between a soft under layer CoTaZr film and a CoPtCr—SiO$_2$ magnetic media. In an embodiment, the tri-layer comprises a Ru$_x$Cr$_{1-x}$ layer over dual nucleation layers of Ni—Fe and Ni—Fe—Cr. The tri-layer replaces the typical Ru and Ni—Fe intermediate layers of the prior art, resulting in considerable improvement in lattice matching between the Ru containing intermediate layer and the CoPtCr—SiO$_2$ magnetic media, further resulting in improved magnetic media performance.

30 Claims, 12 Drawing Sheets

| Cell | Ru Alloy Strain (%) RMS | Ru alloy Grain Size (nm) | Ru Alloy Text (FWHM) | CoX Strain (%) RMS | CoX Grain Size (nm) | CoX Text. (FWHM) | Lattice mismatch (%) |
|---|---|---|---|---|---|---|---|
| Prior Art | 0.5 | 10.37 | 3.04 | .21 | 6.34 | 3.53 | 4.98 |
| Present Invention | 0.47 | 11.76 | 3.05 | .18 | 6.14 | 3.46 | 4.33 |

Figure 7

INTERMEDIATE TRI-LAYER STRUCTURE FOR PERPENDICULAR RECORDING MEDIA

BACKGROUND OF THE INVENTION

1. Field of the Invention

This invention relates to the structure of magnetic recording media. More specifically, the invention relates to the structure of perpendicular recording media (PMR).

2. Description of the Related Art

Magnetic media are widely used in various applications, particularly in the computer and data storage industries, in devices such as hard disk drives and other recording devices. Efforts are continually being made with the aim of increasing the areal recording density, i.e., bit density of the magnetic media. In order to produce storage densities in excess of 200 $Gb/in^2$, new recording media structures will be required. In this regard, perpendicular recording media structures (PMR) have been found to be superior to the more conventional longitudinal media in achieving very high bit densities. In perpendicular magnetic recording media, residual magnetization is formed in a direction perpendicular to the surface of the magnetic medium.

US Patent Application Publication US 2002/0058160 discloses a perpendicular magnetic recording medium comprising a combination of an under layer of a laminate structure including at least two layers and a Co-based magnetic layer. The particular combination is selected from the group consisting of i) Fe-containing layer/Ru/magnetic layer, ii) Co-containing layer/Ru/magnetic layer, iii) Ru/Co-containing layer/magnetic layer, iv) Ti-containing layer/Ru/magnetic layer, and v) soft magnetic layer/V or Cr/magnetic layer. A multi-layered structure of magnetic layer/Ru/magnetic layer is used as the magnetic layer included in combinations i) to v) given above. The perpendicular magnetic recording medium of the particular construction permits improving the perpendicular orientation of the Co-based magnetic layer and exhibits a high coercive force and a high reproducing output.

US Patent Application Publication US 2003/0203189 discloses an improved perpendicular magnetic recording medium suitable for high density magnetic recording. In a perpendicular magnetic recording medium comprising a perpendicular magnetic layer and protective layer provided on a non-magnetic substrate via a soft magnetic backlayer, a polycrystalline MgO film is inserted between the soft magnetic backlayer and perpendicular magnetic layer.

US Patent Application Publication US 2004/0000374 discloses a perpendicular magnetic recording medium having a magnetic recording layer with ferromagnetic crystalline grains and nonmagnetic and nonmetallic grain boundary region surrounding the grains. The surface of its under layer, before forming the magnetic recording layer, is exposed to an $O_2$ or $N_2$ atmosphere or an atmosphere of rare gas and $O_2$ or $N_2$, to attach the $O_2$ or $N_2$ as nucleation sites for promoting growth of the nonmagnetic and nonmetallic region. By forming the magnetic recording layer thereafter, both ferromagnetic crystalline grains and the nonmagnetic and nonmetallic grain boundary region are formed from the initial stage of the growth of the magnetic recording layer. Thus, a magnetic recording layer having excellent segregation structure can be formed.

US Patent Application Publication US 2004/0001975 discloses a double layered perpendicular recording media having, between a soft magnetic layer and perpendicular magnetic recording layer, an alignment control layer containing an amorphous portion, a crystal size control layer, and an under layer having one of a hexagonal closest packed structure and a face-centered cubic structure.

US Patent Application Publication US 2004/0072031 discloses a magnetic recording medium including a magnetic recording layer and a substrate that supports the magnetic recording layer. At least two under layers including a nonmetallic under layer are placed between the magnetic recording layer and the substrate. The perpendicular magnetic recording medium uses a double-layered or tri-layered under layer. Accordingly, a perpendicular magnetic recording layer can have a high perpendicular magnetic anisotropic energy constant Ku due to a third under layer and have small crystal grains and a small exchange coupling due to a second under layer below the third underlayer. Thus, the perpendicular magnetic recording layer can have a good thermal stability, high-density recording characteristics, and excellent SNR characteristics.

US Patent Application Publication US 2004/0247945 discloses a perpendicular magnetic recording medium, comprising: (a) a non-magnetic substrate having a surface; and (b) a layer stack formed over the substrate surface, comprising in overlying sequence from the substrate surface: (i) a magnetically soft under layer; (ii) an interlayer structure for crystallographically orienting a layer of a perpendicular magnetic recording material formed thereon; and (iii) at least one crystallographically oriented magnetically hard perpendicular recording layer; wherein the magnetically soft under layer is sputter-deposited at a sufficiently large target-to-substrate spacing and at a sufficiently low gas pressure selected to provide the under layer with a smooth surface having a low average surface roughness Ra below about 0.3 nm, as measured by Atomic Force Microscopy (AFM).

U.S. Pat. No. 6,858,320 discloses performance of a perpendicular magnetic recording medium, such as an increase in output or a decrease in noise, improved by providing a good orientation of a magnetic recording layer in the perpendicular magnetic recording medium and by reducing an amount of an initial growth layer in the magnetic recording layer. The perpendicular magnetic recording medium includes an under layer, a magnetic recording layer, a protective film, and a liquid lubrication layer, which are sequentially provided on a non-magnetic substrate. The under layer contains non-magnetic NiFeCr or a permalloy-based soft magnetic material.

U.S. Pat. No. 6,699,600 discloses a magnetic recording medium comprising, on a non-magnetic substrate, at least a soft magnetic undercoat film comprising a soft magnetic material; an orientation control film for controlling an orientation of a film directly above; a perpendicular magnetic film in which an axis of easy magnetization is oriented mainly perpendicularly with respect to the substrate; and, a protection film, wherein the perpendicular magnetic film has a structure in which a large number of magnetic grains are separated by a grain boundary layer, and an average separating distance between the magnetic grains along a straight line which connects centers of gravity of mutually neighboring magnetic grains of 1 nm or greater.

U.S. Pat. No. 6,670,056 discloses a perpendicular magnetic recording medium having magnetic characteristics by which an anisotropic magnetic field Hk and a saturation magnetization Ms satisfy the requirement $2<Hk/4\pi Ms<5$, letting $\alpha$ be the inclination of an MH loop when a magnetic field is applied perpendicularly, the anisotropic magnetic field Hk, the saturation magnetization Ms, and a coercive force Hc satisfy the requirement $0.01<\{(\alpha-1)Hc+4\pi Ms\}/Hk<0.2$, and a longitudinal residual magnetization Mr is less than 0.2 times the saturation magnetization Ms.

An article entitled "Very High Density and Low Cost Perpendicular Magnetic Recording Media Including New Layer Structure 'U-Mag'", by Matsunuma et al., IEEE Trans on Magnetics, Vol 41, No. 2, February 2005, discloses a new layered structure, named "U-Mag", for perpendicular recording media. The stacked films include a very thin ferromagnetic Co layer (2 nm) and lattice spacing control layers. The structure formed with a 100 nm soft magnetic under layer with high coercivity shows a higher signal to noise ratio than a medium using a conventional Ru underlayer.

Fabrication of one type of prior art perpendicular recording media (PMR) employs a Ru hcp (hexagonal closed packed) under layer to control the c-axis orientation of the Co based magnetic recording layer. The Ru growth and its structural characteristics are critical for achieving the desired magnetic and microstructural properties of the recording medium. The Ru hcp under layer is grown on a seed layer such as $Ni_{80}Fe_{20}$ and the Ru growth parameters (the sputter pressure, growth rate, etc) are optimized to improve its crystallographic properties and to improve lattice matching to the Co alloy layer. FIG. 1 (Prior Art) shows a prior art perpendicular media architecture 100 in which dual hcp under layers 114a, 114b of Ru grown at different sputter pressures and having different thicknesses are employed to control the microstructural properties of the PMR CoPtCr—$SiO_2$ magnetic recording layer 118. The use of such Ru hcp dual under layers to improve recording media performance is consistent with the teachings of Hikosaka, U.S. Pat. No. 6,670,056. Typically, layer 114a is 5 nm thick, grown at a sputtering pressure of 5 mTorr, and layer 114b is 12 nm thick, grown at a sputtering pressure of 55 mTorr. Alternatively, layers 114a and 114b may be combined into a single layer, grown at a single sputtering pressure. The structure shown in FIG. 1 includes a 2 nm thick layer 112 of $Ni_{80}Fe_{20}$ to nucleate the desired growth orientation of the subsequently grown Ru hcp under layers 114. Layer 112 is grown over a pair of 75 nm CoTaZr soft under layers (SUL) 106 and 110, which are separated by a 0.7 nm Ru layer 108. The SUL layers 106 and 110 are deposited over substrate 102 and AlTi layer 104. Overcoat layers 120 are deposited on top of recording layer 118, and include protective and lubricating components. The layers intercalated between the top of the SUL 110 and the CoPtCr—$SiO_2$ alloy magnetic recording layer 118 may be referred to as the Inter-Mediate Layers or IML for short.

Variations of this structure have been implemented to fit media fabrication constraints (such as number of available sputter targets) and include replacing the dual hcp under layers by a single Ru hcp under layer grown at an optimized high sputter pressure. In addition other workers in the field have replaced the $Ni_{20}Fe_{80}$ nucleation layer by different Ni alloys such as NiCr, NiV, NiW. Furthermore different alloys such as NiAl, CrTa and CuNb have been investigated as Ru nucleation layers in order to improve its micro-structural properties.

Ru is chosen as a component in prior art IMLs for a number of reasons. Firstly, the Ru hcp under layer 114 is produced with a strong crystallographic texture as a result of its basal plane being predominantly aligned parallel to the film plane of the $Ni_{20}Fe_{80}$ nucleation layer 112. Secondly, Ru is chosen to achieve lattice matching between its hexagonal plane and that of the CoPtCr—$SiO_2$ alloy in magnetic recording layer 118. A representative schematic showing a typical hcp structure and lattice constants a and c are found in FIG. 3 (Prior Art). Thirdly, control of grain size and grain size distribution of the Ru hcp under layer 114 is employed to control the grain size of the CoPtCr—$SiO_2$ alloy in magnetic recording layer 118. Although implementation of Ru in prior art IML's has led to significant improvements in perpendicular media performance, there exists inherent limitations to this solution. The lattice parameters of the Ru hcp under layer 114 can be modified only up to a certain point by altering growth conditions. The evolution of defects, faults and stress relaxation imposes a hard limit to lattice parameter changes. Additionally, control of the grain size, grain size distribution, and nucleation kinetics required for the formation of the desired crystallographic orientation is limited when employing prior art processing technology.

What is needed is an IML structure that provides microstructural improvements of the magnetic recording layer and a large improvement in magnetic recording performance when compared to prior art PMR media employing the same magnetic recording layer.

SUMMARY OF THE INVENTION

It is an object of the present invention to provide a perpendicular recording media containing a magnetic recording layer, a soft under layer and, an intermediate layer structure disposed between the magnetic recording layer and the soft under layer. The intermediate layer further contains a first nucleation layer formed over the soft under layer comprising a Ni alloy, a second nucleation layer formed over the first nucleation layer comprising a Ni alloy including at least two other elements, and an hcp under layer formed over the second nucleation layer comprising a Ru alloy.

It is another object of the present invention to provide a perpendicular recording media containing a magnetic recording layer, a soft under layer and, an intermediate layer structure disposed between the magnetic recording layer and the soft under layer. The intermediate layer further contains a first nucleation layer formed over the soft under layer comprising a Ni—Fe alloy, a second nucleation layer formed over the first nucleation layer comprising a Ni—Fe—Cr alloy, and an hcp under layer formed over the second nucleation layer comprising a binary Ru—Cr alloy.

BRIEF DESCRIPTION OF THE DRAWINGS

The present invention will be better understood when consideration is given to the following detailed description thereof. Such description makes reference to the annexed drawings, wherein:

FIG. 7 is a table showing various film properties for the comparison data of FIG. 5, according to an embodiment of the present invention;

DETAILED DESCRIPTION OF THE PREFERRED EMBODIMENTS

The present invention seeks to provide an improved IML composition and structure to overcome the inherent limitations of prior art IML fabrication and materials choices.

First, the $Ni_{80}Fe_{20}$ nucleation layer 112 for the growth of the hcp under layer is replaced by dual nucleation layers. Employing such a dual layer structure achieves a number of improvements over prior art approaches. Through selection of the thickness ratio of the dual nucleation layers, the present invention provides a wider range of lattice parameters when compared to a single nucleation layer. This results in a wider range of thin film strain values. Additionally, altering the thickness of the dual nucleation layers of the present invention can result in new single phase materials with novel properties, particularly if the layer thickness is on the order of the diffusion length at the growth temperature. Each of the layers in the dual nucleation layer structure may have different surface energies, chemical properties, porosity and other microstructural attributes which can be combined and optimized to satisfy different material functions. These include but are not limited to good adhesion to the soft under layer (SUL) 110, and increased wet-ability for the formation of thermodynamically hindered crystallographic phases for films grown on a subsequently deposited hcp under layer.

Second, the Ru under layers 114a,b are replaced by a Ru binary alloy hcp under layer whose lattice parameters more closely matches that of the magnetic alloy layer 118.

The foregoing modifications to the IML structure of the present invention result in significant improvements in the performance of the PRM, as shall be demonstrated in subsequent examples below.

Figure 1:
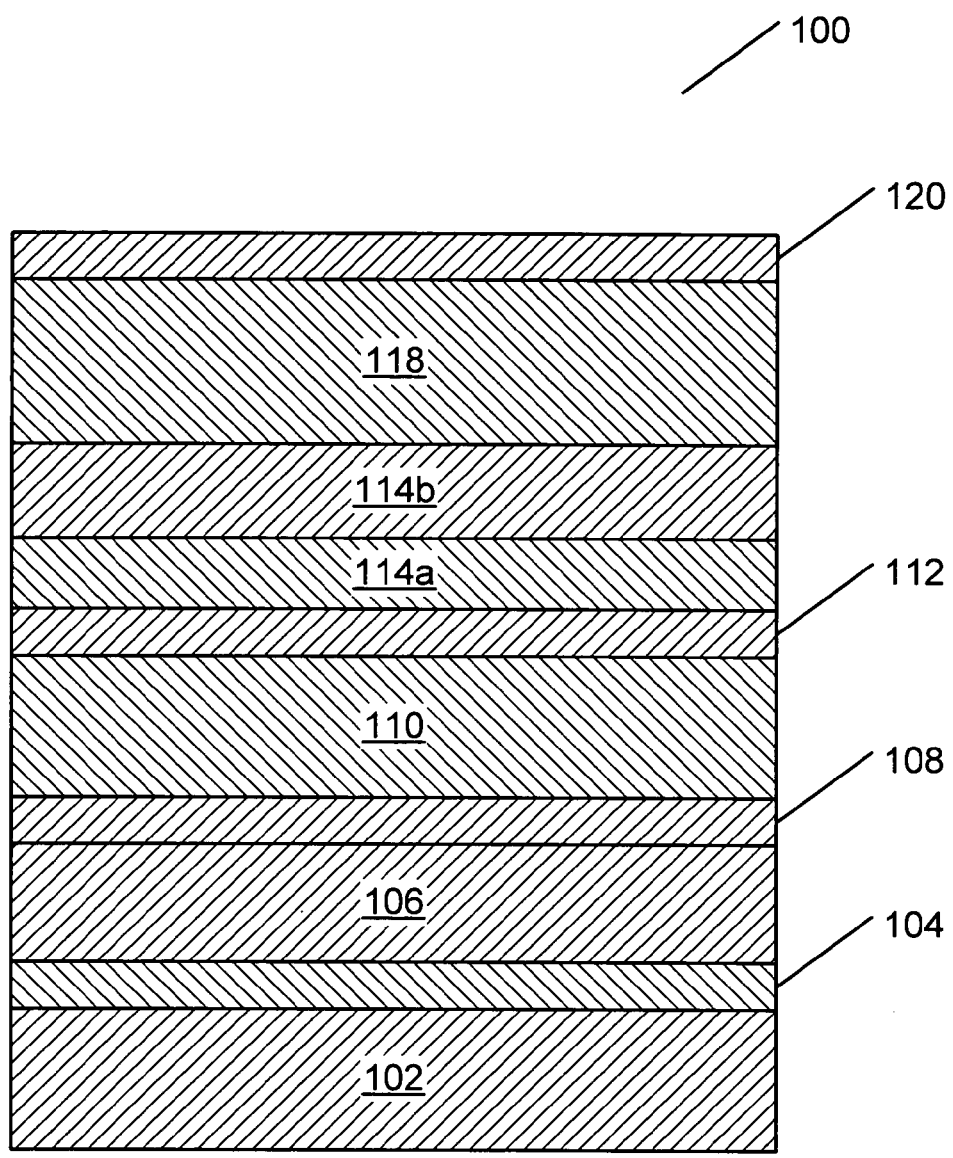
FIG. 1 (Prior Art) is a partial cross sectional schematic view of the layered structure of a perpendicular recording medium.
Figure 2:
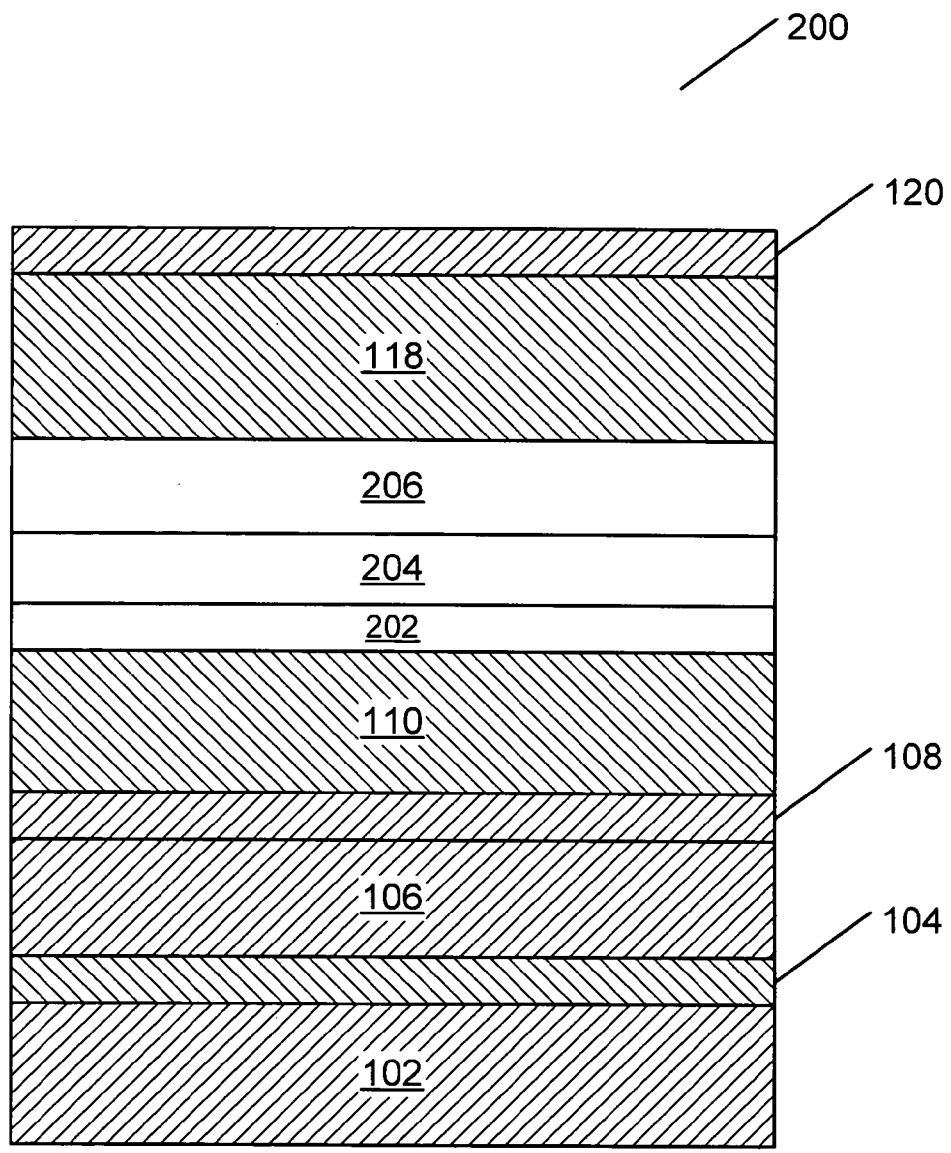
FIG. 2 is a partial cross sectional schematic view of a layered structure of a perpendicular recording medium according to an embodiment of the present invention.

FIG. 2 is a partial cross sectional schematic view 200 of a layered structure of a perpendicular recording medium according to an embodiment of the present invention. Layers 202, 204, and 206 comprise the novel tri-layer IML structure of the present invention. Layers 202 and 204 comprise the dual nucleation layers, and layer 206 comprises the Ru binary alloy hcp under layer. Together, layers 202-206 replace layers 114a, 114b, and 112 of the prior art structure shown in FIG. 1.

Layer 202 may be composed of binary alloys of Ni, in the form $Ni_xM_{1-x}$, where for the purposes of this disclosure, x represents the Ni composition in atomic %. For example a $Ni_{80}Fe_{20}$ alloy would contain 80 atomic % Ni and 20 atomic % Fe. Preferably, M is Fe. However M may also be chosen from among the group containing Mn, Co, V, W and Cu. For $Ni_xFe_{1-x}$ alloys, x may be within the range of 72 to 92 atomic %, but is preferably about 80 atomic %. The thickness of layer 202 is within the range of 0.1 to 6 nm, preferably about 2.0 nm. Layer 202 is preferably deposited by sputtering, at a pressure range between 1 and 10 mTorr, preferably at about 5.6 mTorr. Layer 202 may also be composed of Ni alloys including two or more other elements. One such alloy is $Ni_xFe_yCr_{(1-x-y)}$, where x+y may be within the range of 72 to 92 atomic %, but is preferably about 80 atomic %.

Layer 204 may be composed of ternary alloys of Ni, in the form $Ni_xA_yB_{(1-x-y)}$, where A and B are chosen from among the group containing Fe, Cr, Mn, Co, V, W and Cu. Preferably, A is Fe and B is Cr. For Ni—Fe—Cr alloys, x may be within the range of 40 to 80 atomic %, y within the range of 8 to 30 atomic %, and the Cr concentration within the range of 15 to 40 atomic %. Preferably, x is within the range of 64 to 50 atomic %, y is within the range of 16 to 12 atomic %, and the Cr concentration within the range of 20 to 38 atomic %. The thickness of layer 204 is within the range of 0.1 to 6 nm, preferably about 1.8 nm. Layer 204 is preferably deposited by sputtering, at a pressure range between 1 and 10 mTorr, preferably at about 5.0 mTorr. Layer 204 may also be composed of Ni alloys including three or more other elements. One such alloy is $Ni_xFe_yCu_zCr_{(1-x-y-z)}$, where x is within the range of 64 to 50 atomic %, y+z is within the range of 16 to 12 atomic %, and the Cr concentration within the range of 20 to 38 atomic %.

Layer 206 may be composed of a binary Ru alloy, in the form $Ru_xD_{(1-x)}$, where D is chosen from among Cr, Mn, V, Co, Fe, Cu, Re, Os and Zn, but is preferably Cr. For $Ru_xCr_{(1-x)}$ alloys, x is within the range of 65 to 85 atomic %, but is preferably about 75 atomic %. The thickness of layer 206 is within the range of 6 to 24 nm, preferably about 16 nm. Layer 206 is preferably deposited by sputtering, at a pressure range between 20 and 100 mTorr, preferably at about 46 mTorr. Layer 206 may also be composed of Ru or an Ru alloy including 2 or more other elements.

EXAMPLE EMBODIMENTS

The following example embodiments illustrate the improvements obtained by the present invention over typical prior art. They, in no way, are meant to limit the scope or application of the invention.

Figure 3:
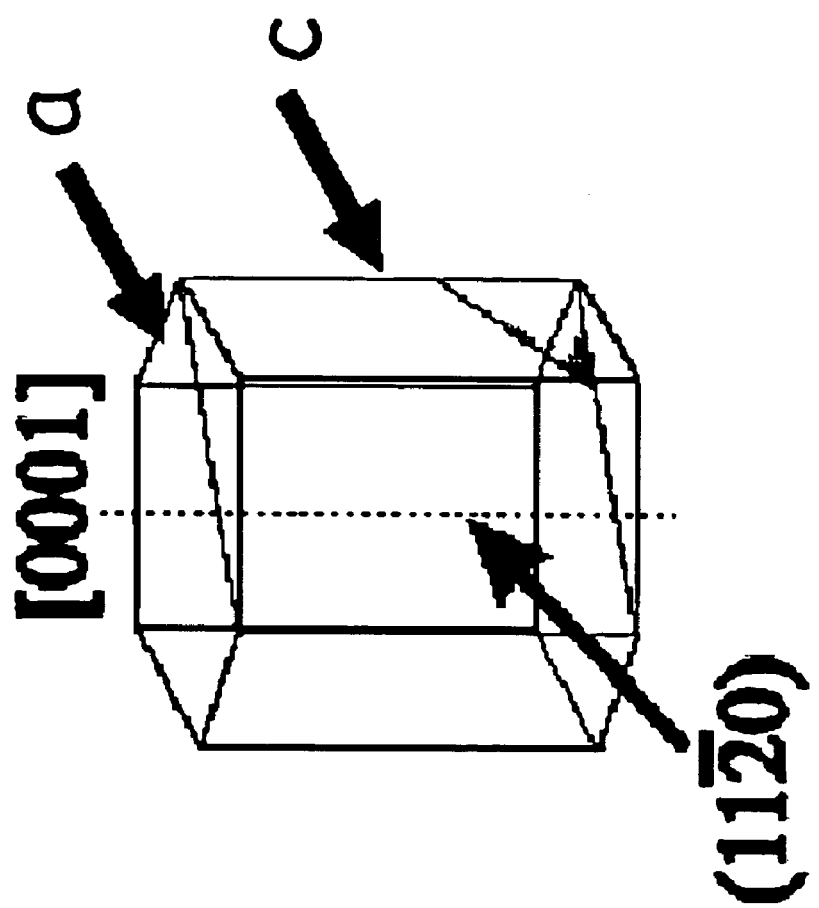
FIG. 3 (Prior Art) is a schematic view of a hexagonal close packed crystal structure showing lattice constants a and c.
Figure 4:
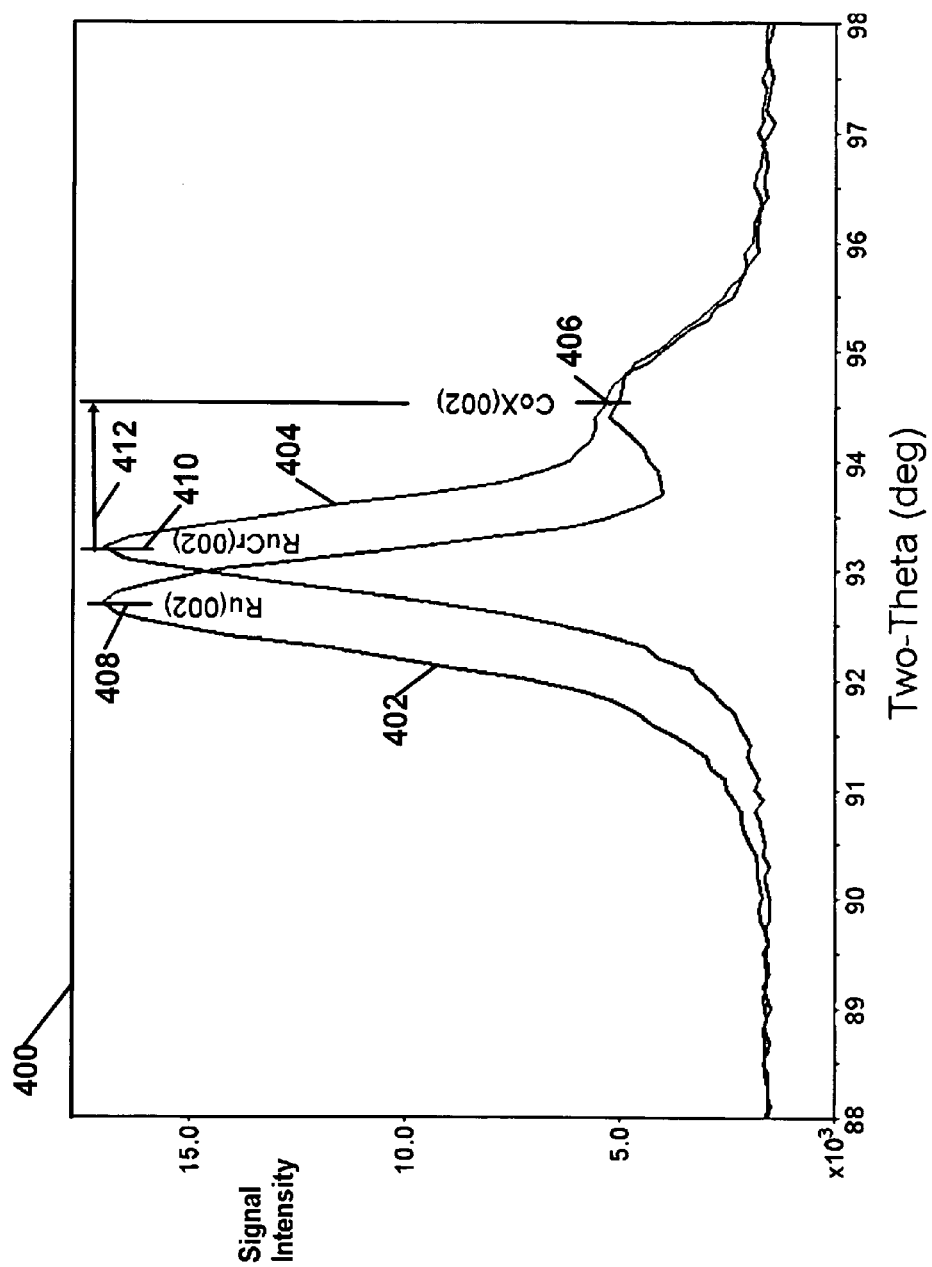
FIG. 4 is an out of plane XRD plot illustrating improved lattice matching according to an embodiment of the present invention.

FIG. 4 is an out of plane XRD (x-ray diffraction) plot 400 illustrating improved lattice matching according to an embodiment of the present invention. The figure compares out-of-plane spectra for Ru (curve 402) and $Ru_{75}Cr_{25}$ (curve 404) under layers grown under identical sputtering conditions on 2.0 nm thick $Ni_{80}Fe_{20}$ nucleation layers. The shift in the peak position 410 (for the reflection corresponding to the [002] $Ru_{75}Cr_{25}$ basal plane) from the peak position 408 (corresponding to pure Ru) indicates that the a-parameter for the $Ru_{75}Cr_{25}$ alloy is smaller than that of Ru. Please refer to FIG. 3 (Prior Art) which depicts the lattice parameters for an hcp unit cell of Ru and $Ru_{75}Cr_{25}$. In FIG. 4, the closer the peak position of the under layer to that of the CoX peak 406, the better the lattice match. A perfect match would be obtained as distance 412 approaches zero and the peak position of the Ru containing under layer overlaps the position of the CoX peak 406. The better lattice matching is the result of the Cr being substitutionally incorporated within the Ru—Cr unit cell, the Cr atomic radius (1.85 Å) being smaller than the atomic radius of Ru (1.89 Å). Lattice parameters measured from the spectra in FIG. 4 are: $a_{Ru}$=2.71 Å; $a_{RuCr}$=2.69 Å; $a_{CoX}$=2.58 Å. From these measurements, it can be readily seen that the a-parameter for $Ru_{75}Cr_{25}$ is closer to the value of the CoPtCr—$SiO_2$ alloy, therefore improving the lattice matching.

Figure 5:
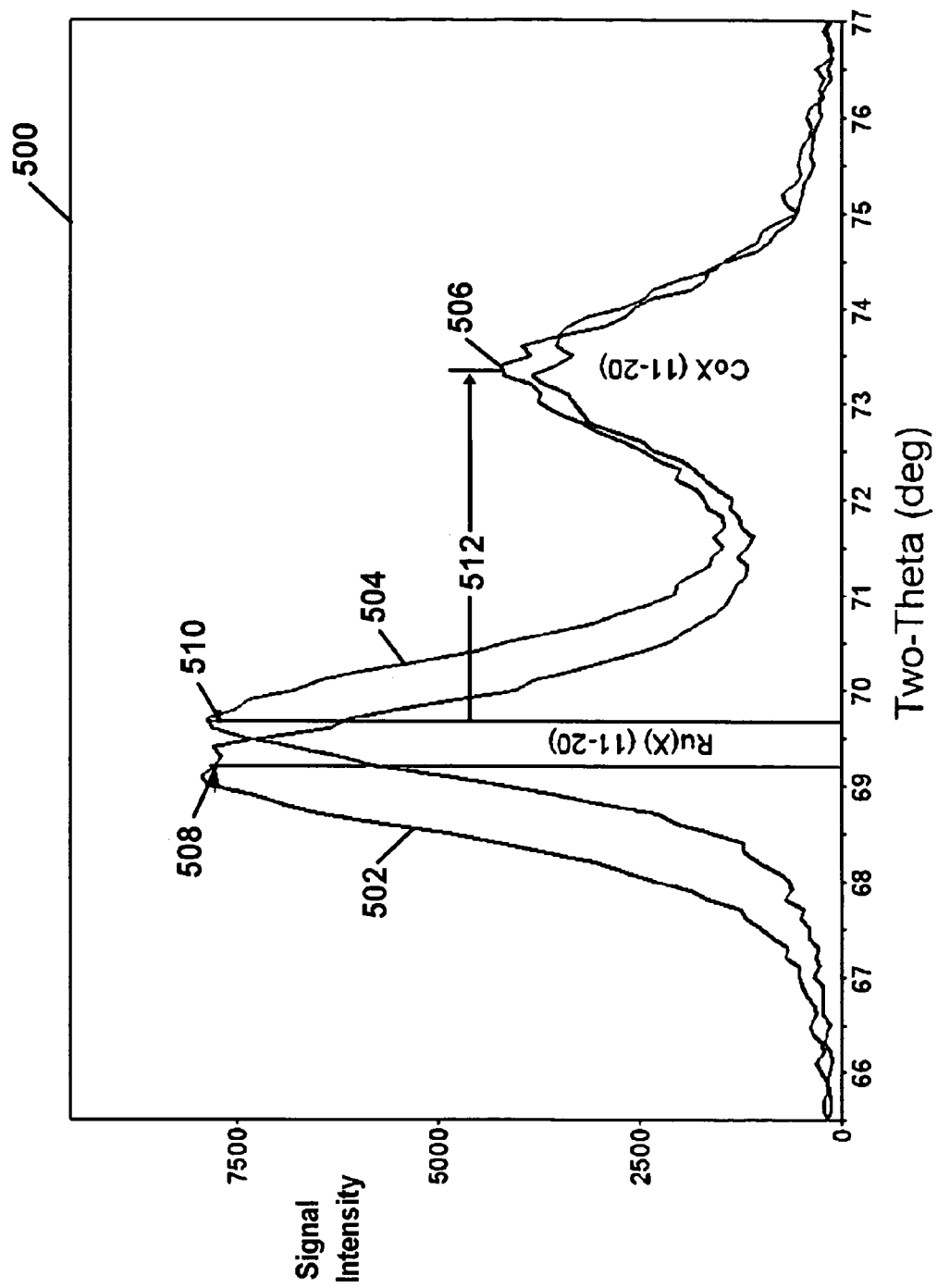
FIG. 5 is an in plane XRD plot illustrating the lattice matching comparison of a prior art PMR structure with an example tri-layer IML structure according to an embodiment of the present invention.

FIG. 5 is an in plane XRD plot 500 illustrating the lattice matching comparison of a prior art PMR structure (curve 502) with an example tri-layer IML structure (curve 504) according to an embodiment of the present invention. In this chart, a prior art PMR structure containing a 2.0 nm $Ni_{80}Fe_{20}$ seed layer 112 and a 16 nm Ru under layer 114 is compared with an example tri-layer IML structure comprising a 2.0 nm Ni$_{80}$Fe$_{20}$ layer 202, a 1.8 nm Ni$_{64}$Fe$_{16}$Cr$_{20}$ layer 204, and a 12.5 nm Ru$_{75}$Cr$_{25}$ layer 206 of the present invention. The deposition conditions for the above cited films can be found in FIG. 6. All other components of the PMR structure (i.e. layers 102-110, 118, 120) were identical and constructed in a manner well known to those skilled in the art. The reflections shown in the spectrum in this grazing incidence measurement originate from the (1120) planes (see FIG. 3) of the under layers and the CoPtCr—SiO$_2$ thin films. As can be seen in FIG. 5, distance 512 indicates the peak position 510, corresponding to curve 504 (the IML structure of the present invention), is closer to the CoPtCr—SiO$_2$ peak position 506 than the peak position 508 of the prior art PMR structure curve 502. As previously discussed, this indicates better lattice parameter matching of the present invention when compared to the prior art. Further analysis of the data in FIG. 5 indicates additional micro-structural improvements which are disclosed below in FIG. 7.

Figure 6:
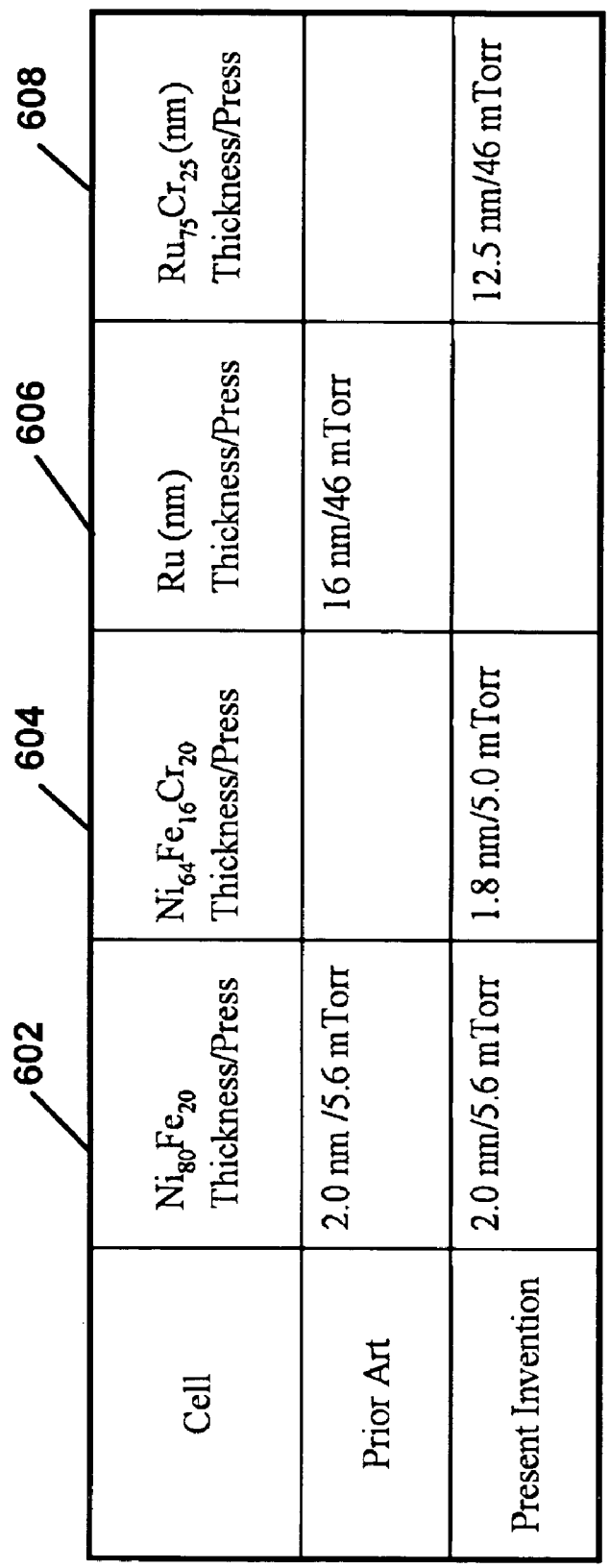
FIG. 6 is a table showing various film thickness and deposition pressures for the comparison data of FIG. 5, according to an embodiment of the present invention.

FIG. 6 is a table showing various film thickness and deposition pressures for the comparison data of FIG. 5, according to an embodiment of the present invention. Column 602 gives the Ni$_{80}$Fe$_{20}$ film thickness and sputter deposition pressure for films in both the prior art and an example of the present invention. Column 604 gives the Ni$_{64}$Fe$_{16}$Cr$_{20}$ film thickness and sputter deposition pressure for films in an example of the present invention. Column 606 gives the Ru film thickness and sputter deposition pressure for films in the prior art example. Column 608 gives the Ru$_{75}$Cr$_{25}$ alloy film thickness and sputter deposition pressure for films in an example of the present invention.

FIG. 7 is a table showing various film properties for the comparison data of FIG. 5, according to an embodiment of the present invention. Column 702 compares the Ru$_{75}$Cr$_{25}$ alloy RMS strain, in %, of the present invention to that of the prior art Ru films. The Ru$_{75}$Cr$_{25}$ film of the present invention shows a reduced RMS strain of 0.47% when compared to the prior art film RMS strain of 0.5%. Column 704 compares the grain size of the Ru$_{75}$Cr$_{25}$ alloy of the present invention to that of the Ru prior art. Column 706 compares the Ru$_{75}$Cr$_{25}$ alloy texture of the present invention to a Ru film of the prior art. Column 708 compares the CoPtCr—SiO$_2$ film RMS strain, in %, of the present invention with that of the prior art. The tri-layer IML film structure of the present invention reduces the RMS strain of the magnetic CoPtCr—SiO$_2$ film from 0.21% to 0.18%, the result of a better lattice matching condition. Likewise, the grain size (column 710), texture (column 712), and lattice mismatch (column 714) of the present invention all show decreases from prior art values, which confirm better lattice matching of the present invention.

Figure 8:
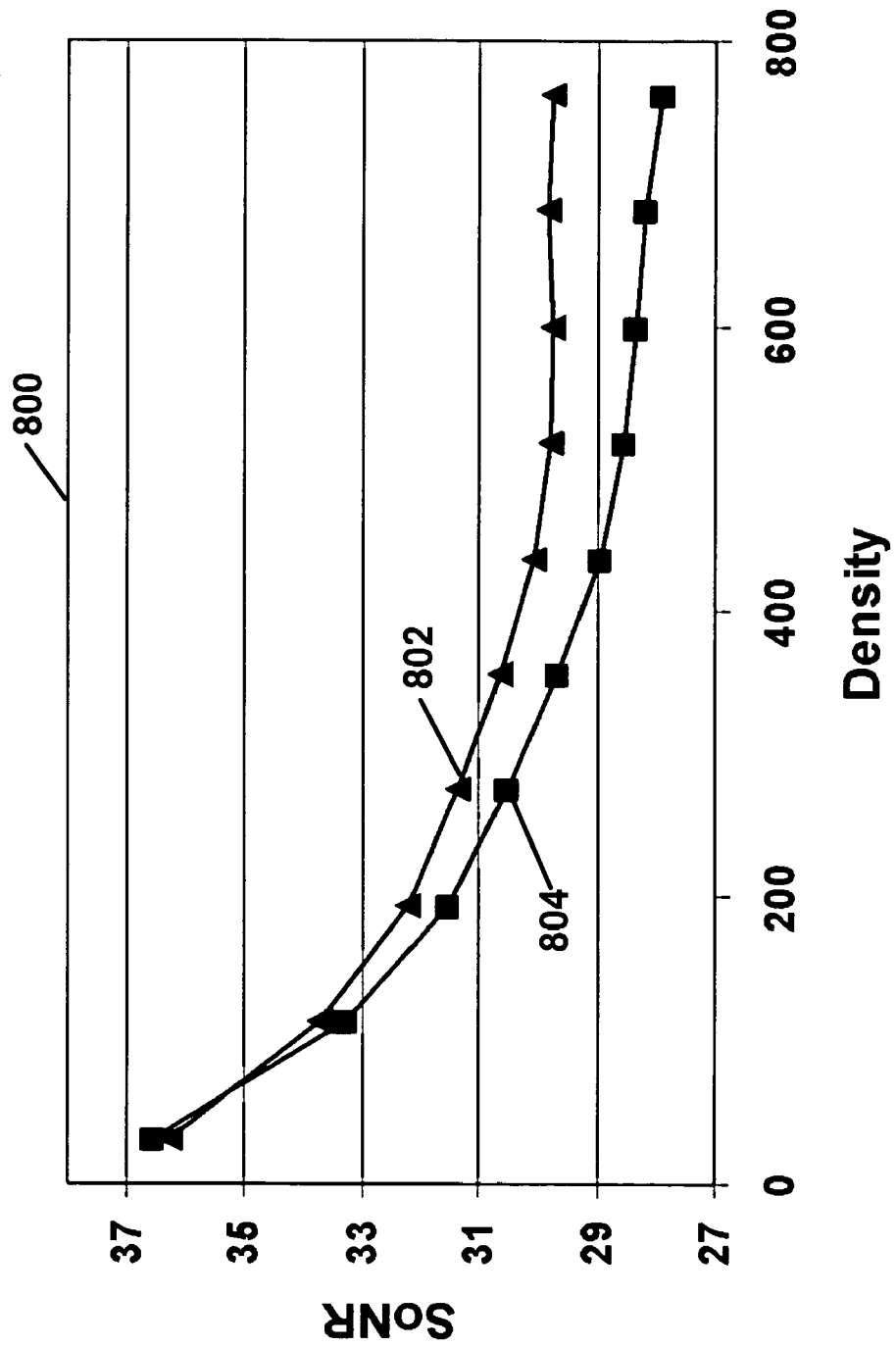
FIG. 8 is a plot showing signal to noise ratio versus flux density according to an embodiment of the present invention.
Figure 9:
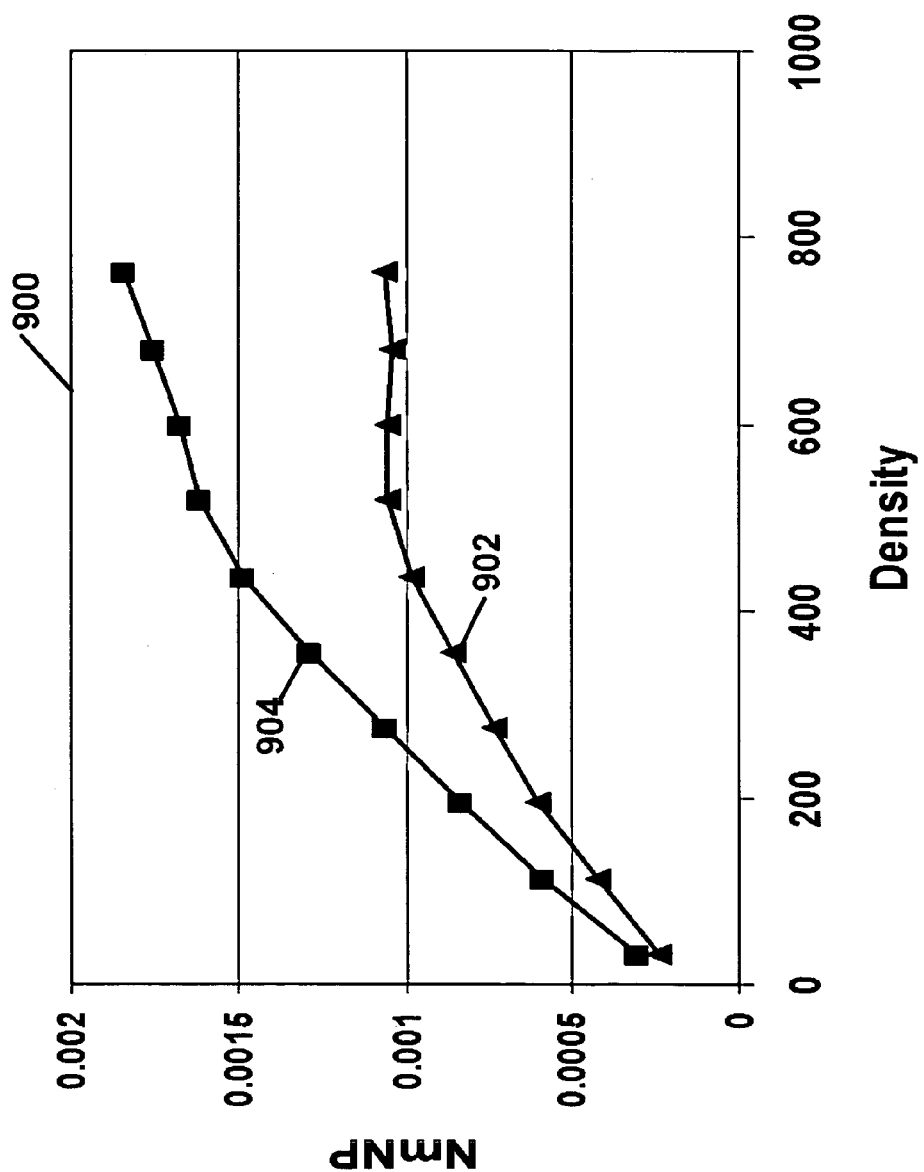
FIG. 9 is a plot showing normalized media noise power (NmNP) versus flux density according to an embodiment of the present invention.

The remaining FIGS. 8-12 illustrate the recording media performance of PMR structures built in accordance with teachings of the present invention. A Guzik tester was employed to measure byte error rates (BER), signal to noise ratio, media noise, and saturation performance in accordance with methods well known to those skilled in the art. FIG. 8 is a plot 800 showing signal to noise ratio (SoNR) versus flux density according to an embodiment of the present invention. The units of measurement are decibels (dB) for SoNR and kfci (kilo-flux-changes/inch) for density. Curve 802 represents the performance of a PMR structure of the present invention. Curve 804 represents the performance of a PMR structure of the prior art. As can be noted in the figure, the signal to noise ratio is significantly improved over the prior art for densities above about 100 kfci, and is particularly better at the higher densities greater than 400 kfci. FIG. 9 is a plot 900 showing normalized media noise power (NmNP) versus flux density according to an embodiment of the present invention. Curve 902 represents the performance of a PMR structure of the present invention. Curve 904 represents the performance of a PMR structure of the prior art. Data in this plot confirms the improved noise performance of media of the present invention, particularly at higher densities.

Figure 10:
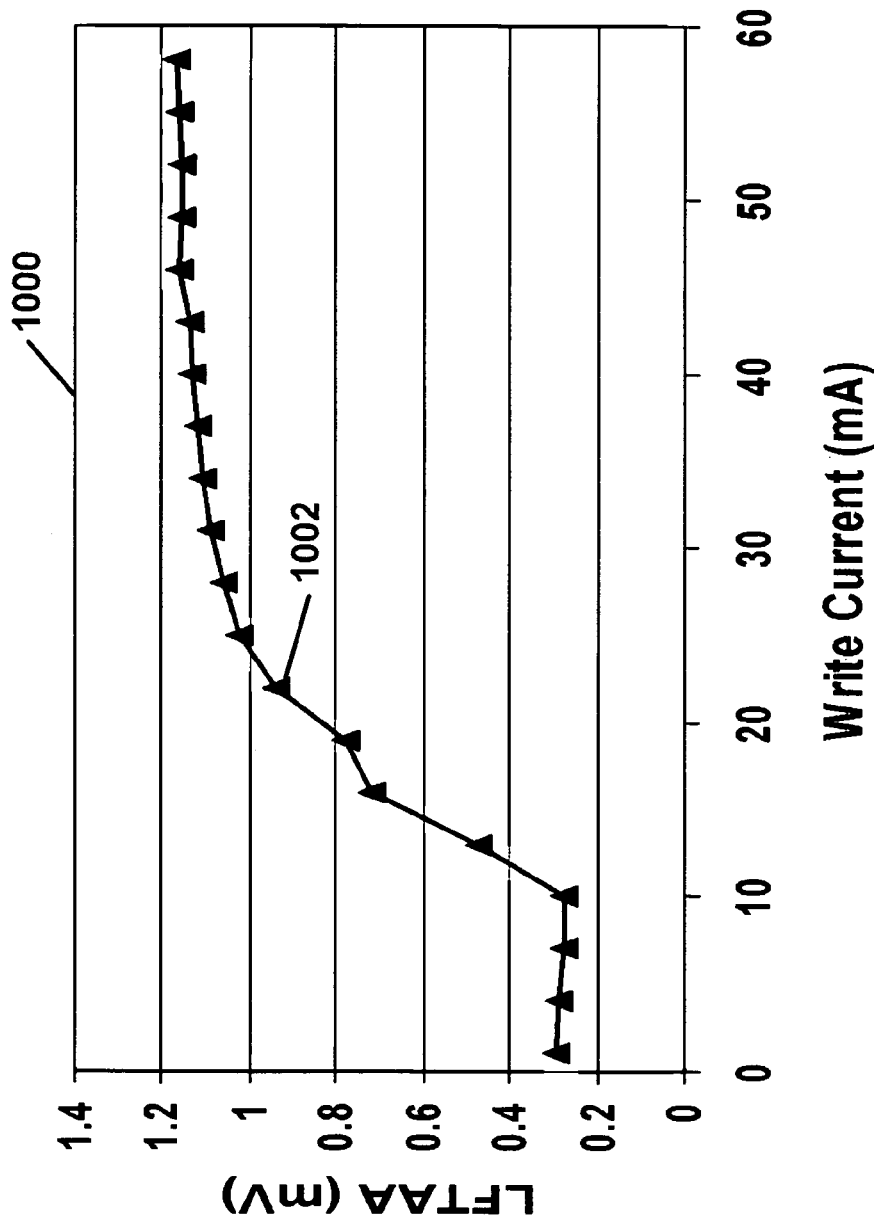
FIG. 10 is a plot showing saturation performance versus write current according to an embodiment of the present invention.

FIG. 10 is a plot 1000 showing saturation performance according to an embodiment of the present invention. Curve 1002 represents the low frequency track average amplitude (LFTAA) of a previously recorded signal as a function of write current. The sluggish rise of curve 1002 is due in part to a significant increase in the coercivity of the CoPtCr—SiO$_2$ film from a typical prior art value of 6050 to 7580 Oe. The higher Hc exhibited by the example embodiment of the present invention illustrated in FIG. 10 requires higher currents to adequately write the medium. The write currents can be reduced, if desired, by reducing the thickness of the Ru$_{75}$Cr$_{25}$ layer to lower Hc.

Figure 11:
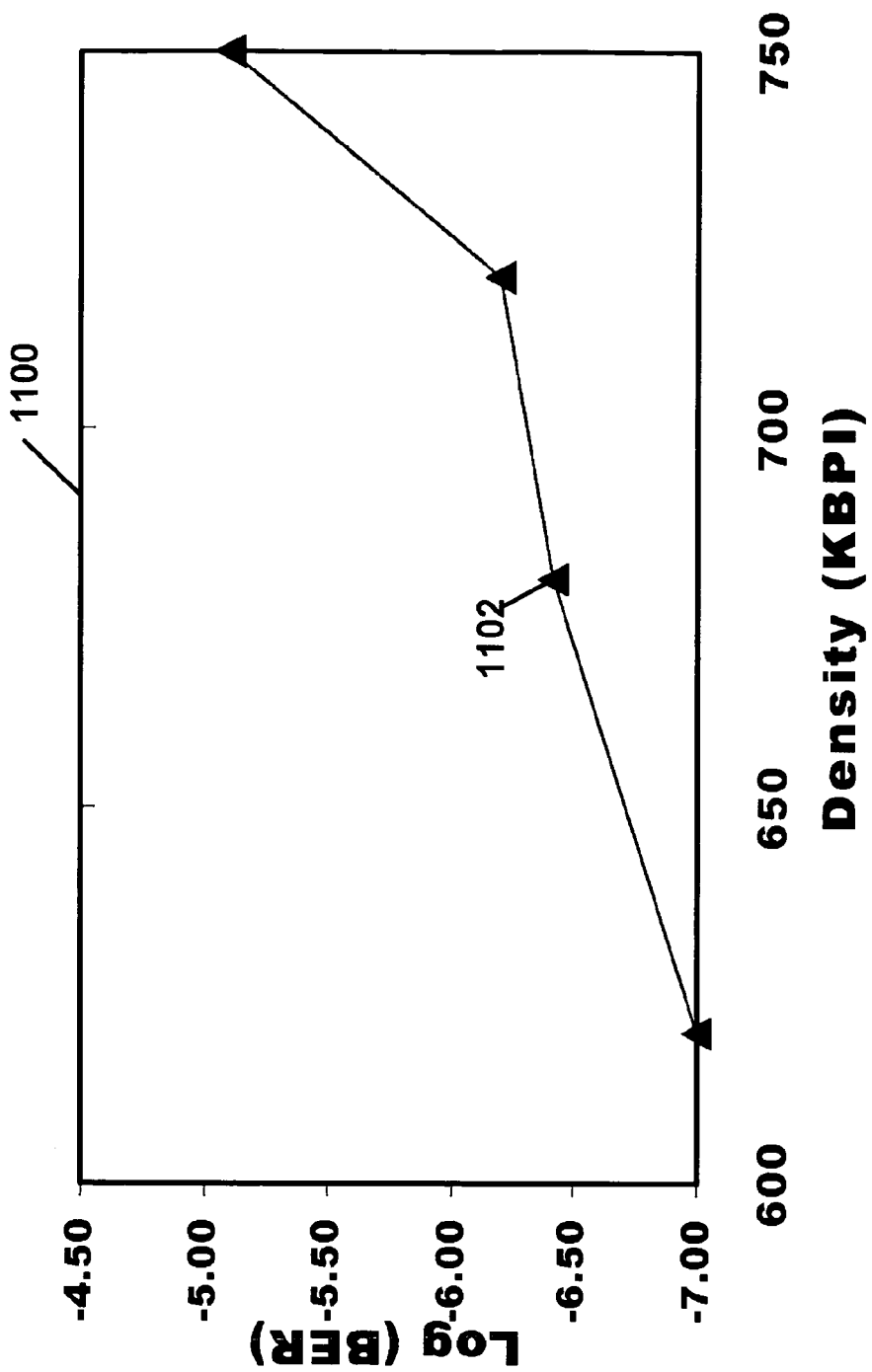
FIG. 11 is a plot showing the log of the byte error rate (BER) versus bit density according to an embodiment of the present invention; and, FIG. 12 is a bar chart comparing the log of the byte error rate of a prior art media with an example embodiment of the present invention.
Figure 12:
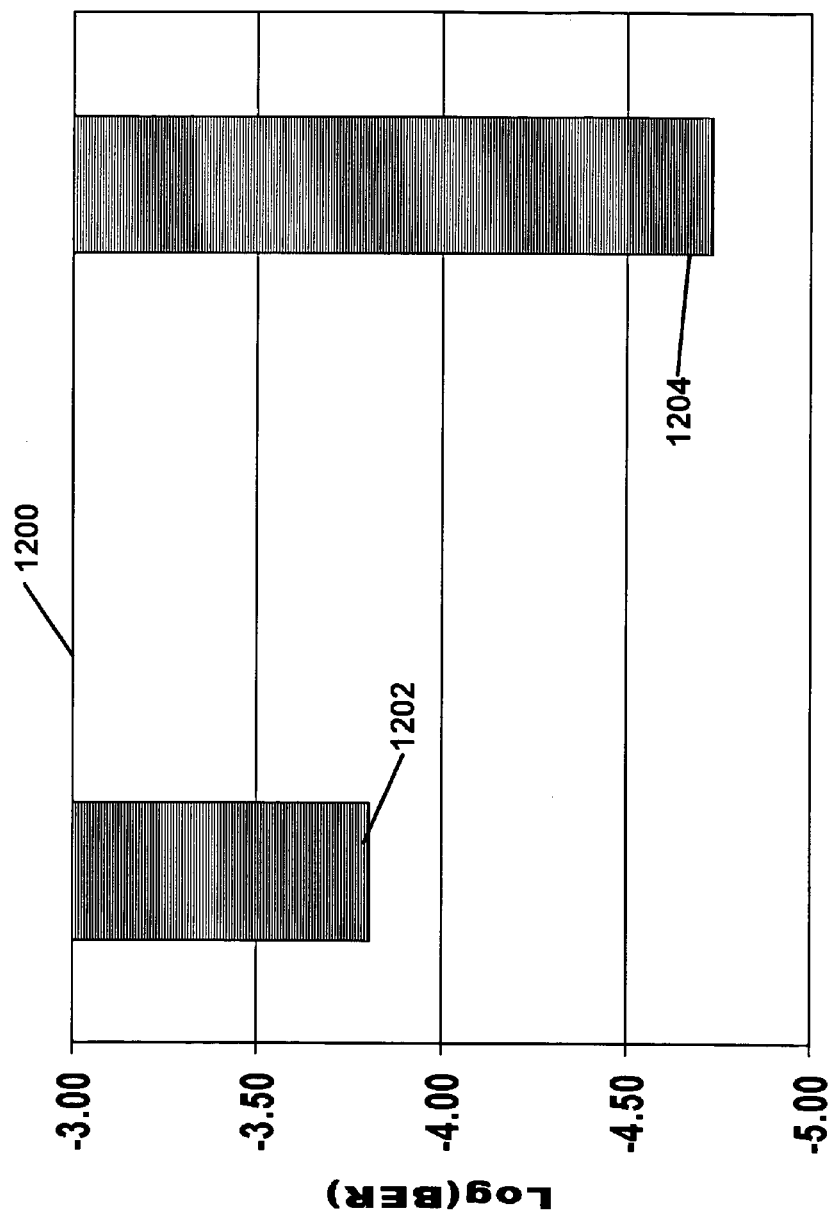

FIG. 11 is a plot showing the log of the byte error rate (BER) versus bit density (kbpi or kilo-bits/inch) according to an embodiment of the present invention. A comparison of BER is shown in FIG. 12, a bar chart 1200 comparing the log of the byte error rate of a prior art media with an example embodiment of the present invention at linear density of 720 kbpi. Bar 1202 represents the log of the BER for the prior art. Bar 1204 represents the log of the BER of an example embodiment of the present invention. This data indicates that the present invention provides a byte error rate (@ about $10^{-4.75}$) approximately an order of magnitude lower than the prior art (@ about $10^{-3.75}$).

The present invention is not limited by the previous embodiments or examples heretofore described. Rather, the scope of the present invention is to be defined by these descriptions taken together with the attached claims and their equivalents.

What is claimed is:

1. A perpendicular recording media comprising:
   a magnetic recording layer;
   a soft under layer; and,
   an intermediate layer structure disposed between said magnetic recording layer and said soft under layer, further comprising
      a first nucleation layer formed over and in contact with said soft under layer, said first nucleation layer comprising a binary Ni alloy of the form Ni-M, M being chosen from the group consisting of Fe, Mn, Co, V, W, and Cu, said first nucleation layer having a thickness between 0.1 nm and 6 nm,
      a second nucleation layer formed over and in contact with said first nucleation layer, said second nucleation layer comprising a Ni alloy including at least two other elements, said second nucleation layer having a thickness between 0.1 nm and 6 nm, and
      an hcp under layer formed over and in contact with said second nucleation layer, said hcp under layer comprising a Ru alloy.

2. The media as recited in claim 1, wherein said second nucleation layer is a ternary Ni alloy.

3. The media as recited in claim 2, wherein said ternary Ni alloy is of the form Ni-A-B, where A and B are chosen from the group consisting of Fe, Cr, Mn, Co, V, W and Cu.

4. The media as recited in claim 3, wherein A is Fe and B is Cr.

5. The media as recited in claim 4, wherein said ternary Ni alloy has a Ni concentration between 40 and 80 atomic %, an Fe concentration between 8 and 30 atomic %, and a Cr concentration between 15 and 40 atomic %.

6. The media as recited in claim 5, wherein said ternary Ni alloy has a Ni concentration between 50 and 64 atomic %, an Fe concentration between 16 and 12 atomic %, and a Cr concentration between 20 and 38 atomic %.

7. The media as recited in claim 1, wherein said magnetic recording layer comprises Co, Pt, Cr, and SiO2; and, said soft under layer comprises Co, Ta, and Zr.

8. The media as recited in claim 1, wherein said binary Ni alloy has a Ni concentration between 72 and 92 atomic %.

9. The media as recited in claim 1, wherein M is Fe.

10. The media as recited in claim 9, wherein said binary Ni alloy has the Ni concentration of about 80 atomic %, and an Fe concentration of about 20 atomic %.

11. The media as recited in claim 1, wherein said second nucleation layer is about 2.0 nm in thickness.

12. The media as recited in claim 1, wherein said first nucleation layer is about 2.0 nm thick.

13. The media as recited in claim 1, wherein said Ru alloy is of the form Ru-D, where D is chosen from the group consisting of Cr, Mn, V, Co, Fe, Cu, Re, Os and Zn.

14. The media as recited in claim 13, wherein D is Cr.

15. The media as recited in claim 13, wherein said hcp under layer is between 6 and 24 nm thick.

16. The media as recited in claim 13, wherein said hcp under layer is about 16 nm thick.

17. The media as recited in claim 1, wherein said Ru alloy has a Ru concentration between 65 and 85 atomic %.

18. The media as recited in claim 1, wherein said Ru alloy has a Ru concentration of about 75 atomic %.

19. A perpendicular recording media comprising:
a magnetic recording layer;
a soft under layer; and,
an intermediate layer structure disposed between said magnetic recording layer and said soft under layer, further comprising
a first nucleation layer formed over and in contact with said soft under layer, said first nucleation layer comprising a Ni—Fe alloy, said first nucleation layer having a thickness between 0.1 nm and 6 nm,
a second nucleation layer formed over and in contact with said first nucleation layer, said second nucleation layer comprising a Ni—Fe—Cr alloy, said first nucleation layer having a thickness between 0.1 nm and 6 nm, and
an hcp under layer formed over and in contact with said second nucleation layer, said hcp under layer comprising a Ru—Cr alloy.

20. The media as recited in claim 19, wherein said magnetic recording layer comprises Co, Pt, Cr, and SiO2; and, said soft under layer comprises Co, Ta, and Zr.

21. The media as recited in claim 19, wherein said Ni—Fe alloy has a Ni concentration between 72 and 92 atomic %.

22. The media as recited in claim 21, wherein said Ni—Fe alloy has the Ni concentration of about 80 atomic %, and an Fe concentration of about 20 atomic %.

23. The media as recited in claim 19, wherein said first nucleation layer is about 2.0 nm thick.

24. The media as recited in claim 19, wherein said Ni—Fe—Cr alloy has a Ni concentration between 40 and 80 atomic %, an Fe concentration between 8 and 30 atomic %, and a Cr concentration between 15 and 40 atomic %.

25. The media as recited in claim 19, wherein said Ni—Fe—Cr alloy has a Ni concentration between 50 and 64 atomic %, an Fe concentration between 16 and 12 atomic %, and a Cr concentration between 20 and 38 atomic %.

26. The media as recited in claim 19, wherein said second nucleation layer is about 1.8 nm thick.

27. The media as recited in claim 19, wherein said Ru—Cr alloy has a Ru concentration between 65 and 85 atomic %.

28. The media as recited in claim 19, wherein said Ru—Cr alloy has a Ru concentration of about 75 atomic %.

29. The media as recited in claim 19, wherein said hcp under layer is between 6 and 24 nm thick.

30. The media as recited in claim 19, wherein said hcp under layer is about 16 nm thick.

* * * * *